(12) United States Patent
Li et al.

(10) Patent No.: US 11,714,303 B2
(45) Date of Patent: Aug. 1, 2023

(54) DISPLAY DEVICE

(71) Applicants: Beijing BOE Display Technology Co., Ltd., Beijing (CN); BOE Technology Group Co., Ltd., Beijing (CN)

(72) Inventors: Zhuolong Li, Beijing (CN); Yu Zhang, Beijing (CN); Guangyun Tong, Beijing (CN); Liang Bo, Beijing (CN); Miao Liu, Beijing (CN); Xuefei Qin, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 83 days.

(21) Appl. No.: 17/512,634

(22) Filed: Oct. 27, 2021

(65) Prior Publication Data

US 2022/0291537 A1 Sep. 15, 2022

(30) Foreign Application Priority Data

Mar. 9, 2021 (CN) .......................... 202120500718.2

(51) Int. Cl.
  *G02F 1/133* (2006.01)
  *G02F 1/1347* (2006.01)
  *G02F 1/1333* (2006.01)
(52) U.S. Cl.
  CPC ........ *G02F 1/13306* (2013.01); *G02F 1/1347* (2013.01); *G02F 1/133308* (2013.01); *G02F 2203/48* (2013.01)

(58) Field of Classification Search
  CPC .......... G02F 1/13306; G02F 1/133308; G02F 1/1347
  See application file for complete search history.

(56) References Cited

U.S. PATENT DOCUMENTS

| | | | | |
|---|---|---|---|---|
| 8,568,012 | B2 * | 10/2013 | Park ..................... | G02B 6/0023 362/97.3 |
| 10,677,421 | B2 * | 6/2020 | Takeshita ............... | H05B 45/20 |
| 11,598,509 | B2 * | 3/2023 | Lee .................... | G02F 1/133605 |
| 2011/0273659 | A1 * | 11/2011 | Sobecki ................. | B60R 1/088 349/195 |
| 2016/0324013 | A1 * | 11/2016 | Lee ......................... | G06F 1/16 |
| 2017/0082887 | A1 * | 3/2017 | Kubota ............ | G02F 1/133345 |
| 2018/0017827 | A1 * | 1/2018 | Kil ........................ | G02B 6/0055 |
| 2018/0059317 | A1 * | 3/2018 | Kim ................... | G02B 6/0081 |
| 2018/0149903 | A1 * | 5/2018 | Kim ................. | G02F 1/133308 |

* cited by examiner

*Primary Examiner* — Bryon T Gyllstrom

(74) *Attorney, Agent, or Firm* — Ling Wu; Stephen Yang; Ling and Yang Intellectual Property

(57) ABSTRACT

A display device is disclosed, which includes a display screen and a dimming screen which are arranged in a stacked manner, a backlight module on a side of the dimming screen away from the display screen, and a circuit board module on a side of the backlight module away from the dimming screen. The circuit board module includes a first control circuit board on the side of the backlight module away from the dimming screen and a second control circuit board on a side of the first control circuit board away from the backlight module, the first control circuit board is electrically connected with the dimming screen through a first Chip On Film and the second control circuit board is electrically connected with the display screen through a second Chip On Film. The circuit board module further includes a first support frame and a second support frame.

20 Claims, 4 Drawing Sheets

DISPLAY DEVICE

CROSS-REFERENCE TO RELATED APPLICATION

The present application claims priority of Chinese Patent Application No. 202120500718.2 filed to the CNIPA on Mar. 9, 2021, the content of which is hereby incorporated by reference.

TECHNICAL FIELD

Embodiments of the present disclosure relate to, but are not limited to, the field of display technologies, specifically to a display device.

BACKGROUND

A Liquid Crystal Display (LCD) controls light penetrating a liquid crystal layer by controlling rotation directions and rotation angles of liquid crystal molecules, thereby displaying images of various gray scales. The LCD has advantages of high picture quality, small size, light weight, etc., and is widely applied in products such as mobile phones, laptop computers, televisions, and displays.

Advantages of display image quality of the LCD lie in large size, high resolution, and fine picture details, while its disadvantages lie in insufficient color gamut, slow response speed, and low contrast. A super-high-contrast overlay display technology is proposed for LCD displaying, in which a contrast ratio may be larger than 1,000,000:1, so that the image quality of the LCD displaying may be comparable to an Organic Light-Emitting Diode (OLED) display panel and has great advantages in aspects such as image quality detail, large size, resolution, reliability, cost, and power consumption, and is widely used in TV, monitor (MNT), vehicle, medical, augmented reality (AR)/virtual reality (VR), and other fields.

At present, two display screens in an overlay display product are controlled by independent control circuit boards, which are unstable in fixation strength, prone to shaking, produce abnormal noises, and even fall off, thus affecting a display effect of the overlay display product.

SUMMARY

The following is a summary of subject matters described in the present disclosure in detail. This summary is not intended to limit the scope of protection of claims.

An embodiment of the present disclosure provides a display device, which includes a display screen and a dimming screen which are arranged in a stacked manner, a backlight module located on a side of the dimming screen facing away from the display screen, and a circuit board module located on a side of the backlight module facing away from the dimming screen. The circuit board module includes a first control circuit board located on the side of the backlight module facing away from the dimming screen and a second control circuit board located on a side of the first control circuit board facing away from the backlight module, wherein the first control circuit board is electrically connected with the dimming screen through a first Chip On Film and the second control circuit board is electrically connected with the display screen through a second Chip On Film. The circuit board module further includes a first support frame for fixing the first control circuit board on the backlight module, and a second support frame for fixing the second control circuit board on the first support frame.

In an exemplary embodiment, a first screw hole is formed on a side of the first support frame, the first support frame is screwed with the backlight module through the first screw hole, and the first control circuit board is locked between the first support frame and the backlight module.

In an exemplary embodiment, a bent portion is arranged on a side of the first support frame away from the first screw hole, and the bent portion presses the first control circuit board on the backlight module.

In an exemplary embodiment, the bent portion is U-shaped.

In an exemplary embodiment, a first cushion block is arranged on a side of the bent portion close to the first control circuit board, and the first cushion block presses the first control circuit board on the backlight module.

In an exemplary embodiment, a second screw hole is formed on a side of the second support frame, and the second support frame is screwed with the backlight module through the second screw hole, and a second cushion block is arranged on a side of the second support frame away from the second screw hole, and the second cushion block presses the second control circuit board on the first support frame.

In an exemplary embodiment, the second control circuit board includes a virtual electrode region, and the second cushion block abuts against the virtual electrode region.

In an exemplary embodiment, the first control circuit board is bonded to the backlight module.

In an exemplary embodiment, the second control circuit board is bonded to the first support frame.

In an exemplary embodiment, the backlight module includes a middle frame, and the display screen includes a display region, and a distance between an edge of the display region close to the middle frame and an edge of the middle frame close to the display region is greater than or equal to 0.6 mm.

In an exemplary embodiment, the display screen includes a display region and a bezel region surrounding the display region, and a distance between an edge of the display region close to the bezel region and an edge of the bezel region away from the display region is greater than or equal to 3.6 mm.

In an exemplary embodiment, the first control circuit board includes a first timing control chip electrically connected with the dimming screen through the first Chip On Film, and the second control circuit board includes a second timing control chip electrically connected with the display screen through the second Chip On Film.

In an exemplary embodiment, the display device further includes a field programmable gate array which is electrically connected with the first control circuit board and the second control circuit board respectively.

In an exemplary embodiment, the display device further includes a backlight driving chip electrically connected with the backlight module.

In an exemplary embodiment, the backlight driving chip and the field programmable gate array are respectively arranged in separate boards; or, the backlight driving chip and the field programmable gate array are integrated in a same board.

In an exemplary embodiment, the display screen includes multiple first pixel units, and each of the first pixel units includes at least three sub-pixels of different colors; the dimming screen includes multiple second pixel units; the multiple second pixel units in the dimming screen correspond to the multiple first pixel units in the display screen.

In an exemplary embodiment, when resolutions of the display screen and the dimming screen are the same, the multiple first pixel units correspond to the multiple second pixel units in one-to-one correspondence.

In an exemplary embodiment, a vertical projection of the first support frame on the backlight module is overlapped with a vertical projection of the first control circuit board on the backlight module.

In an exemplary embodiment, in a direction parallel to the display device, a vertical projection of the second control circuit board on the backlight module is overlapped with a vertical projection of the first support frame on the backlight module; a vertical projection of the second support frame on the backlight module is overlapped with a vertical projection of the second control circuit board on the backlight module.

Of course, an implementation of any product or method in the embodiments of the present disclosure does not need to achieve all the advantages mentioned above at the same time. Other features and advantages of the present disclosure will be set forth in the following embodiments of the description, and in part will become apparent from the embodiments of the description, or be learned by practice of the present disclosure. Purposes and other advantages of the technical solutions of the present disclosure may be achieved and acquired by structures specified in the detailed description, claims and drawings.

Other aspects may be understood upon reading and understanding of the drawings and the detailed description.

BRIEF DESCRIPTION OF DRAWINGS

The drawings are used to provide a further understanding of technical solutions of the present disclosure, constitute a part of the specification, are used together with the embodiments of the present disclosure to explain the technical solutions of the present disclosure, and do not constitute limitations on the technical solution of the present disclosure. Shapes and sizes of each component in the drawings do not reflect actual scales, and are only intended to schematically illustrate contents of the present disclosure.

DETAILED DESCRIPTION

Specific implementations of the present disclosure will be described further in detail below with reference to the accompanying drawings and embodiments. The following embodiments serve to illustrate the present disclosure, but are not intended to limit the scope of the present disclosure. The embodiments in the present disclosure and the features in the embodiments may be randomly combined with each other if there is no conflict.

An embodiment of the present disclosure provides a display device, which includes a display screen and a dimming screen that are stacked, a backlight module located on a side of the dimming screen facing away from the display screen, and a circuit board module located on a side of the backlight module facing away from the dimming screen. The circuit board module includes a first control circuit board located on a side of the backlight module facing away from the dimming screen, and a second control circuit located on a side of the first control circuit board facing away from the backlight module. The first control circuit board is electrically connected to the dimming screen through a first Chip On Film, and the second control circuit board is electrically connected to the display screen through a second Chip On Film. The circuit board module further includes a first support frame for fixing the first control circuit board on the backlight module, and a second support frame for fixing the second control circuit board on the first support frame.

Figure 1:
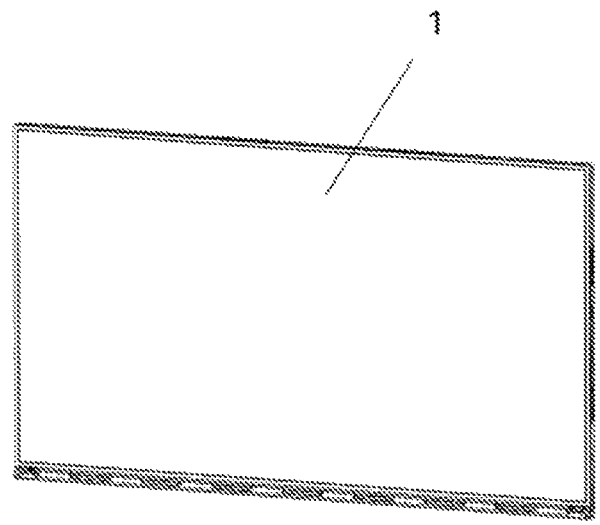
FIG. 1 is a schematic front view of a display device according to an embodiment of the present disclosure.
Figure 2:
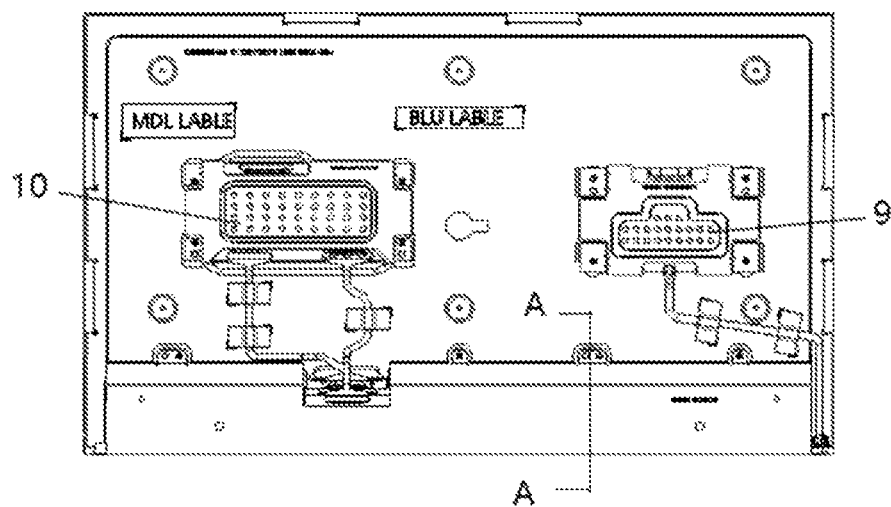
FIG. 2 is a schematic back view of a display device according to an embodiment of the present disclosure.
Figure 3:
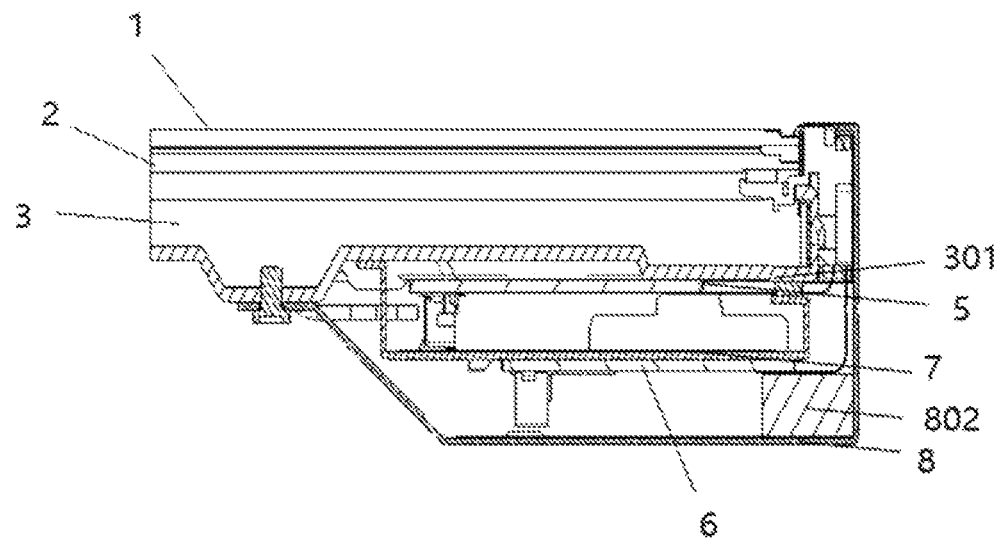
FIG. 3 is a sectional view of a display device according to an embodiment of the present disclosure.

FIG. 1 is a schematic front view of a display device according to an embodiment of the present disclosure. FIG. 2 is a schematic back view of a display device according to an embodiment of the present disclosure. FIG. 3 is a sectional view of a display device according to an embodiment of the present disclosure. FIG. 3 is a sectional view along an A-A direction in FIG. 2. As shown in FIG. 1, FIG. 2, and FIG. 3, the display device according to the embodiment of the present disclosure includes a display screen 1 and a dimming screen 2 which are stacked, a backlight module 3 located on a side of the dimming screen 2 facing away from the display screen 1, and a circuit board module 4 located on a side of the backlight module 3 facing away from the dimming screen 2. The circuit board module 4 includes a first control circuit board 5 located on a side of the backlight module 3 facing away from the dimming screen 2, and a second control circuit board 6 located on a side of the first control circuit board 5 facing away from the backlight module 3. The first control circuit board 5 is electrically connected to the dimming screen 2 through a first Chip On Film, and the second control circuit board 6 is electrically connected to the display screen 1 through a second Chip On Film. The circuit board module 4 also includes a first support frame 7 for fixing the first control circuit board 5 on the backlight module 3, and a second support frame 8 for fixing the second control circuit board 6 on the first support frame 7.

According to the display device provided by the embodiment of the present disclosure, the first control circuit board 5 is fixed on the backlight module 3 by the first support frame 7, and the second control circuit board 6 is fixed on the first support frame 7 by the second support frame 8, thereby enhancing fixation strength of the first control circuit board 5 and the second control circuit board 6, ensuring installation stability of the first control circuit board 5 and the second control circuit board 6, and making the display device suitable for various application scenarios, such as the field of medical display.

In an exemplary embodiment, the display device of the embodiment of the present disclosure may be applied to a portable ultrasonic diagnosis cart. The first support frame 7 and the second support frame 8 can ensure installation stability of the first control circuit board 5 and the second control circuit board 6 in the display device, avoid abnormal noises caused by shaking of the first control circuit board 5 and the second control circuit board 6 when the display device is in motion, and solve a problem that the first control circuit board 5 and the second control circuit board 6 fall off.

In an exemplary embodiment, the dimming screen 2 is used for adjusting a backlight intensity of the display screen 1, which may achieve a pixel-level light control effect and a high contrast effect on the display screen 1. In addition, the dimming screen 2 may be a black-and-white screen, that is, no color film layer is provided in the dimming screen 2.

In an exemplary embodiment, in the display device according to the embodiment of the present invention, the dimming screen may be a liquid crystal display panel. A resolution of the dimming screen may be less than or equal to a resolution of the display screen. Since the display screen is used for displaying pictures, the resolution of the display screen determines a resolution of the display device, and the dimming screen is used for adjusting intensity of light passing through the display screen, therefore the resolution of the dimming screen may be less than or equal to the resolution of the display screen. In an exemplary embodiment, the resolution of the dimming screen may be set to be the same as the resolution of the display screen, so that most of process steps of the display screen and the dimming screen are the same in a manufacturing process, except that the dimming screen may not be provided with a color film layer, therefore the manufacturing process of the display device is easier.

Since both the display screen and the dimming screen are liquid crystal display panels, when the display device displays in a dark state, the display screen and the dimming screen are turned off at the same time, which can greatly reduce brightness of dark state display and improve display contrast of the display device.

In an exemplary embodiment, the display screen may include multiple first pixel units, each of the multiple first pixel units includes sub-pixels of at least three different colors, and the dimming screen may include multiple second pixel units. In order to better adjust backlight intensity of the display screen, the multiple second pixel units in the dimming screen correspond to the multiple first pixel units in the display screen. For example, when the resolution of the display screen and the resolution of the dimming screen are the same, the multiple first pixel units correspond to various second pixel units in one-to-one correspondence. In a display process, as long as one sub-pixel in a first pixel unit is turned on, a corresponding second pixel unit needs to be turned on to provide sufficient backlight for the sub-pixel, thereby avoiding generation of stripes. When the resolution of the dimming screen is lower than the resolution of the display screen, a corresponding relation between the first pixel units and the second pixel units may be set according to actual requirements, which will not be repeated here.

In an exemplary embodiment, the first control circuit board 5 and the second control circuit board 6 are located at edge portions of the display device in a direction parallel to the display device.

Figure 4:
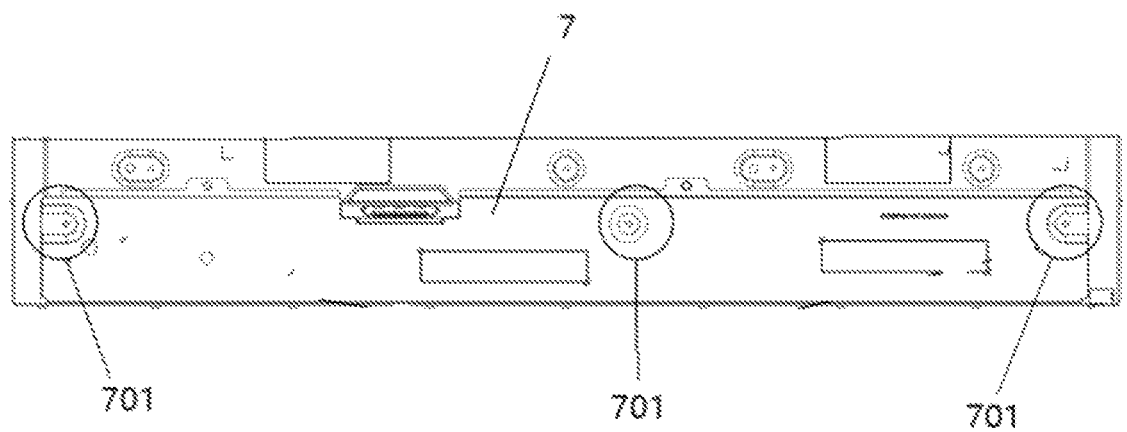
FIG. 4 is a schematic diagram of a first support plate in a display device according to an embodiment of the present disclosure.
Figure 5:
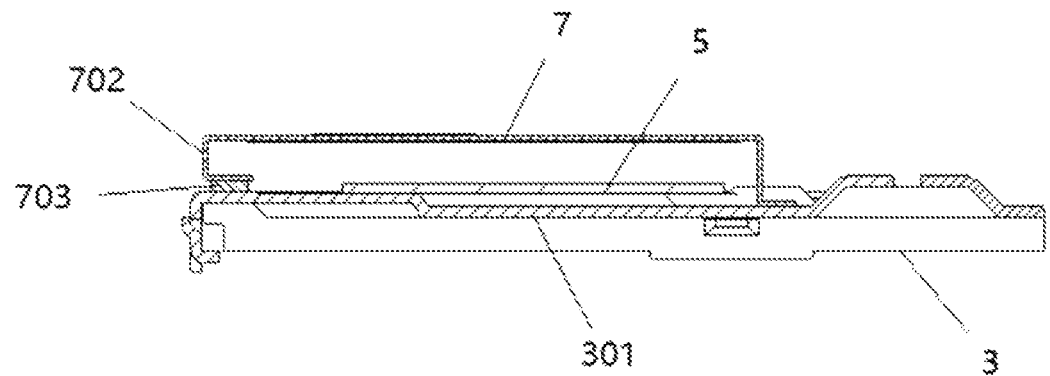
FIG. 5 is a sectional view of a first support plate in a display device according to an embodiment of the present disclosure.

FIG. 4 is a schematic diagram of a first support plate in a display device according to an embodiment of the present disclosure. FIG. 5 is a sectional view of a first support plate in a display device according to an embodiment of the present disclosure. As shown in FIG. 4 and FIG. 5, in the direction parallel to the display device, a vertical projection of a first support frame 7 on a backlight module 3 is overlapped with a vertical projection of a first control circuit board 5 on the backlight module 3, so that the first support frame 7 covers the whole first control circuit board 5 to protect and compress the first control circuit board 5.

In an exemplary embodiment, in the direction perpendicular to the display device, a first screw hole 701 is formed on a side of the first support frame 7, and the backlight module 3 includes a back plate 301. The first support frame 7 is screwed with the back plate 301 in the backlight module 3 through the first screw hole 701, and one side of the first control circuit board 5 is locked between one side of the first support frame 7 and the back plate 301, thereby fixing the first control circuit board 5 on the back plate 301 in the backlight module 3.

In an exemplary embodiment, a bent portion 702 is arranged on a side of the first support frame 7 away from the first screw hole 701, wherein the bent portion 702 is bent along a side of the first support frame 7 close to the first control circuit board 5, and the bent portion 702 may be U-shaped. The bent portion 702 abuts against the first control circuit board 5 to press the first control circuit board 5 on the back plate 301 in the backlight module 3. The first screw hole 701 and the bent portion 702 are respectively located on opposite sides of the first support frame 7, so that opposite sides of the first control circuit board 5 are respectively pressed on the back plate 301 in the backlight module 3, thus strengthening fixation of the first control circuit board 5 and preventing the first control circuit board 5 from loosening and falling off.

In the embodiment of the present disclosure, the first support frame 7 is used for protecting the first control circuit board 5 on the one hand, and for providing a supporting force for the first control circuit board 5 on the other hand, so as to improve use stability of the first control circuit board 5.

In an exemplary embodiment, a first cushion block 703 is provided on a side of the bent portion 702 close to the first control circuit board 5, wherein the first cushion block 703 presses the first control circuit board 5 against the back plate 301 in the backlight module 3. The first cushion block 703 can prevent the first control circuit board 5 from colliding with the back plate 301 in the backlight module 3, which produces abnormal noises. There may be multiple first Chip On Films, and first cushion blocks 703 are located between adjacent first Chip On Films. The first cushion block 703 may be bonded to the bent portion 702, and a thickness of the first cushion block 703 may be 0.5 mm.

Figure 6:
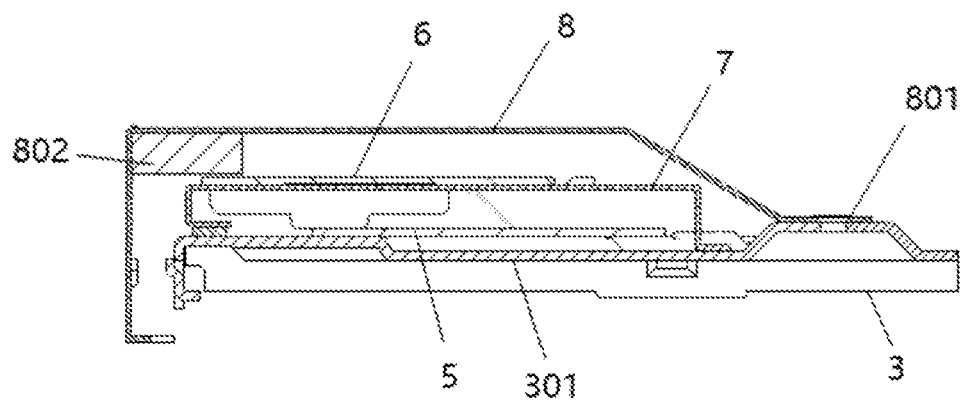
FIG. 6 is a sectional view of a second support plate in a display device according to an embodiment of the present disclosure.

FIG. 6 is a sectional view of a second support plate in a display device according to an embodiment of the present disclosure. As shown in FIG. 6, in the direction parallel to the display device, a vertical projection of a second control circuit board 6 on a backlight module 3 is overlapped with a vertical projection of a first support frame 7 on the backlight module 3, so that the second control circuit board 6 may be fixed on the first support frame 7. A vertical projection of a second support frame 8 on the backlight module 3 is overlapped with a vertical projection of the second control circuit board 6 on the backlight module 3, so that the second support frame 8 covers the whole second control circuit board 6 to protect and compress the second control circuit board 6.

In an exemplary embodiment, in the direction perpendicular to the display device, a second screw hole 801 is arranged on a side of the second support frame 8, the second support frame 8 is screwed with a back plate 301 in the backlight module 3 through the second screw hole 801, and a second cushion block 802 is arranged on a side of the second support frame 8 away from the second screw hole 801, wherein the second cushion block 802 abuts against the second control circuit board 6 to press the second control circuit board 6 on a side of the first support frame 7 away from a first control circuit board 5. On one hand, the second support frame 8 is used for protecting the second control circuit board 6, on the other hand, the second support frame 8 provides a supporting force for the second control circuit board 6, pressing the second control circuit board 6 against the first support frame 7, strengthening fixation of the second control circuit board 6, and improving use stability of the second control circuit board 6.

In an exemplary embodiment, the second control circuit board 6 includes a virtual electrode region, and the second cushion block 802 abuts against the virtual electrode region to prevent damage to a circuit on the second control circuit board 6.

In an exemplary embodiment, the first control circuit board 5 may be bonded to the backlight module 3; and/or the second control circuit board 6 may be bonded to the first support frame 7, thereby further improving the use stability of the first control circuit board 5 and the second control circuit board 6.

Figure 7:
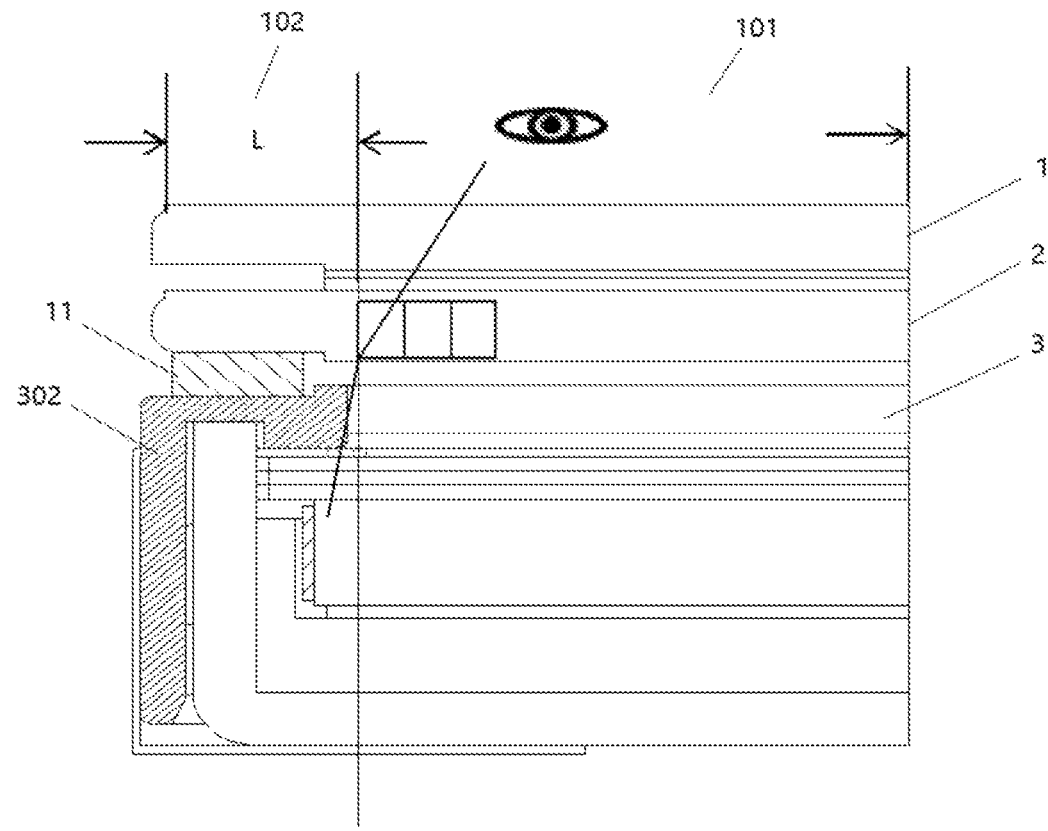
FIG. 7 is a schematic diagram of a light path in a display device according to an embodiment of the present disclosure.

FIG. 7 is a schematic diagram of a light path of a display device according to an embodiment of the present disclosure. As shown in FIG. 7, the display device of the embodiment of the present disclosure achieves a design solution of narrow bezel, so that the display device has application characteristics of high integration and simple and beautiful appearance. A backlight module 3 includes a middle frame 302, and a display screen 1 includes a display region 101 and a bezel region 102 surrounding the display region 101. A distance L between an edge of the display region 101 close to the bezel region 102 and an edge of the bezel region 102 away from the display region 101 is greater than or equal to 3.6 mm, so that a bezel region of a dimming screen 2 has enough adhesive tape width and adhesion to keep the bonding reliable, so as to fix the display screen 1 and the dimming screen 2. An adhesive tape 11 is arranged between the bezel region of the dimming screen 2 and the middle frame 302, and an adhesive distance of the adhesive tape 11 is greater than or equal to 2 mm.

In an exemplary embodiment, according to the display device of the embodiment of the present disclosure, a minimum distance between an edge of the display region 101 close to the middle frame 302 and an edge of the middle frame 302 close to the display region 101 is 0.4 mm through optical calculation. Considering an assembly error and a manufacturing error of the backlight module 3, a distance between the edge of the display region 101 close to the middle frame 302 and the edge of the middle frame 302 close to the display region 101 is greater than or equal to 0.6 mm, to ensure edge picture quality of the display device, and light passing through edge pixels of the display screen 1 may be observed by a user through a light path within a specified viewing angle of 65°, as shown in FIG. 7.

In an exemplary embodiment, the first control circuit board includes a first timing control chip which is electrically connected with the dimming screen through a first Chip On Film and is responsible for display control of the dimming screen. A second control circuit board includes a second timing control chip which is electrically connected with a display screen through a second Chip On Film and is responsible for display control of the display screen.

Figure 8:
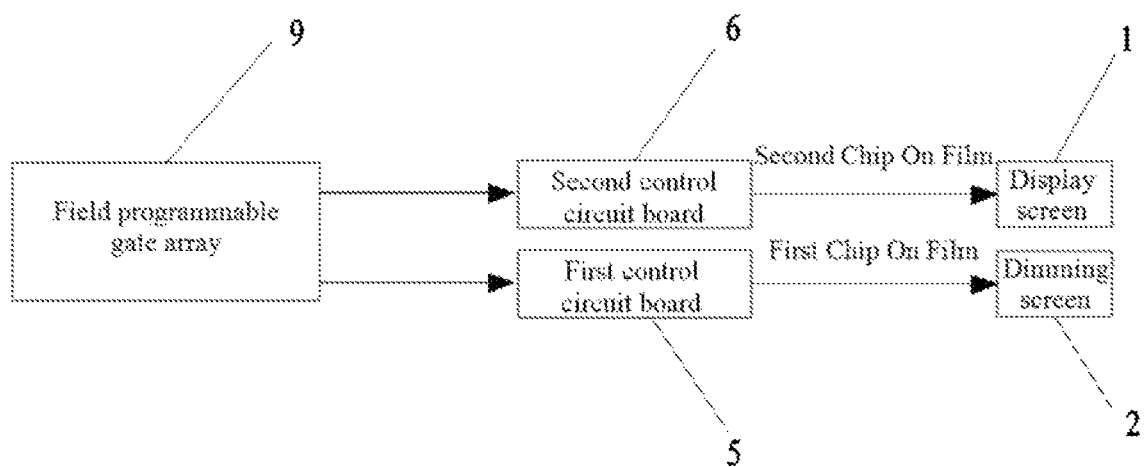
FIG. 8 is a schematic diagram of driving logic of a display device according to an embodiment of the present disclosure.

FIG. 8 is a schematic diagram of driving logic of a display device according to an embodiment of the present disclosure. As shown in FIG. 2 and FIG. 8, the display device of the embodiment of the present disclosure further includes a field programmable gate array 9 electrically connected with the first control circuit board 5 and the second control circuit board 6, respectively. The field programmable gate array 9 as an algorithm processing unit outputs image signals to the first control circuit board 5 and the second control circuit board 6, respectively. An input signal processed by the field programmable gate array 9 forms two paths of image signals which are respectively transmitted to the first control circuit board 5 and the second control circuit board 6. The first control circuit board 5 forms a first dimming signal to provide a driving signal for the dimming screen 2 through the first Chip On Film, and the second control circuit board 6 forms a second dimming signal to provide a driving signal for the display screen 1 through the second Chip On Film, thus achieving respective driving of the display screen 1 and the dimming screen 2. The input signal may be a medical display image signal.

In an exemplary embodiment, as shown in FIG. 2, the display device of the embodiment of the present disclosure further includes a backlight driving chip 10 electrically connected with the backlight module for driving the backlight module.

In an exemplary embodiment, the field programmable gate array 9 and the backlight driving chip 10 may be respectively arranged in separate boards, as shown in FIG. 2. Or, the field programmable gate array 9 and the backlight driver chip 10 are integrated in a same board.

In the description of embodiments of the present disclosure, orientation or positional relations indicated by terms "middle", "upper", "lower", "front", "back", "vertical", "horizontal", "top", "bottom", "inside", "outside" and the like are based on the orientation or positional relations shown in the drawings, and are for the purpose of ease of description of the present disclosure and simplification of the description only, but are not intended to indicate or imply that the mentioned device or element must have a specific orientation, or be constructed and operated in a particular orientation, and therefore they should not be construed as limitation to the present disclosure.

In the description of the embodiments of the present disclosure, it should be noted that unless otherwise clearly specified and defined, the terms "install", "couple", "connect" should be broadly interpreted, for example, a connection may be a fixed connection, or a detachable connection, or an integrated connection; it may be a mechanical connection or an electrical connection; it may be a direct connection, or may be an indirect connection through an intermediary, or may be an internal connection between two elements. For those skilled in the art, the meaning of the above terms in the present disclosure may be understood according to situations.

Although the embodiments disclosed in the present disclosure are as above, the contents described are only embodiments adopted for the convenience of understanding the present disclosure and are not used to limit the present disclosure. Anyone skilled in the art to which the present disclosure pertains may make any modifications and changes in implementation forms and details without departing from the spirit and scope disclosed in the present disclosure. However, the scope of patent protection of the present disclosure is still subject to the scope defined by the appended claims.

What is claimed is:

1. A display device, comprising: a display screen and a dimming screen which are arranged in a stacked manner, a backlight module located on a side of the dimming screen facing away from the display screen, and a circuit board module located on a side of the backlight module facing away from the dimming screen,
  wherein the circuit board module comprises a first control circuit board located on the side of the backlight module facing away from the dimming screen and a second control circuit board located on a side of the first control circuit board facing away from the backlight module, the first control circuit board is electrically connected with the dimming screen through a first Chip On Film and the second control circuit board is electrically connected with the display screen through a second Chip On Film;
  the circuit board module further comprises a first support frame for fixing the first control circuit board on the backlight module, and a second support frame for fixing the second control circuit board on the first support frame.

2. The display device according to claim 1, wherein a first screw hole is formed on a side of the first support frame, the first support frame is screwed with the backlight module through the first screw hole, and the first control circuit board is locked between the first support frame and the backlight module.

3. The display device according to claim 2, wherein a bent portion is arranged on a side of the first support frame away from the first screw hole, and the bent portion presses the first control circuit board on the backlight module.

4. The display device according to claim 3, wherein the bent portion is U-shaped.

5. The display device according to claim 3, wherein a first cushion block is arranged on a side of the bent portion close to the first control circuit board, and the first cushion block presses the first control circuit board on the backlight module.

6. The display device according to claim 1, wherein a second screw hole is formed on a side of the second support frame, and the second support frame is screwed with the backlight module through the second screw hole, and a second cushion block is arranged on a side of the second support frame away from the second screw hole, and the second cushion block presses the second control circuit board on the first support frame.

7. The display device according to claim 6, wherein the second control circuit board comprises a virtual electrode region and the second cushion block abuts against the virtual electrode region.

8. The display device according to claim 1, wherein the first control circuit board is bonded to the backlight module.

9. The display device according to claim 1, wherein the second control circuit board is bonded to the first support frame.

10. The display device according to claim 1, wherein the backlight module comprises a middle frame and the display screen comprises a display region, and a distance between an edge of the display region close to the middle frame and an edge of the middle frame close to the display region is greater than or equal to 0.6 mm.

11. The display device according to claim 1, wherein the display screen comprises a display region and a bezel region surrounding the display region, and a distance between an edge of the display region close to the bezel region and an edge of the bezel region away from the display region is greater than or equal to 3.6 mm.

12. The display device according to claim 1, wherein the first control circuit board comprises a first timing control chip electrically connected with the dimming screen through the first Chip On Film, and the second control circuit board comprises a second timing control chip electrically connected with the display screen through the second Chip On Film.

13. The display device according to claim 12, further comprising a field programmable gate array, which is electrically connected with the first control circuit board and the second control circuit board, respectively.

14. The display device according to claim 13, further comprising a backlight driving chip electrically connected with the backlight module.

15. The display device according to claim 14, wherein the backlight driving chip and the field programmable gate array are respectively arranged in separate boards.

16. The display device according to claim 14, wherein the backlight driving chip and the field programmable gate array are integrated in a same board.

17. The display device according to claim 1, wherein the display screen comprises a plurality of first pixel units, and each of the first pixel units comprises sub-pixels of at least three different colors;
  the dimming screen comprises a plurality of second pixel units; and
  the plurality of second pixel units in the dimming screen correspond to the plurality of first pixel units in the display screen.

18. The display device according to claim 17, wherein when resolutions of the display screen and the dimming screen are the same, the plurality of first pixel units correspond to the plurality of second pixel units in one-to-one correspondence.

19. The display device according to claim 1, wherein a vertical projection of the first support frame on the backlight module is overlapped with a vertical projection of the first control circuit board on the backlight module.

20. The display device according to claim 1, wherein in a direction parallel to the display device, a vertical projection of the second control circuit board on the backlight module is overlapped with a vertical projection of the first support frame on the backlight module; and
  a vertical projection of the second support frame on the backlight module is overlapped with a vertical projection of the second control circuit board on the backlight module.

* * * * *